(12) United States Patent
Zhang et al.

(10) Patent No.: US 10,318,126 B2
(45) Date of Patent: *Jun. 11, 2019

(54) DATA-DRIVEN SCHEMA FOR DESCRIBING AND EXECUTING MANAGEMENT TASKS IN A GRAPHICAL USER INTERFACE

(71) Applicant: Microsoft Technology Licensing, LLC, Redmond, WA (US)

(72) Inventors: Yong Zhang, Redmond, WA (US); Siunie A. Sutjahjo, Seattle, WA (US); Yuan Liu, Beijing (CN); Yong Ren, Beijing (CN); Faen Zhang, Beijing (CN); Yanfeng Guo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,629

(22) Filed: Apr. 3, 2017

(65) Prior Publication Data

US 2017/0205982 A1    Jul. 20, 2017

Related U.S. Application Data

(63) Continuation of application No. 14/837,789, filed on Aug. 27, 2015, now Pat. No. 9,645,719, which is a (Continued)

(51) Int. Cl.
*G06F 9/44*     (2018.01)
*G06F 3/0484*   (2013.01)
(Continued)

(52) U.S. Cl.
CPC ........ *G06F 3/04842* (2013.01); *G06F 3/0482* (2013.01); *G06F 3/0484* (2013.01);
(Continued)

(58) Field of Classification Search
CPC .................................................. G06F 3/04842
(Continued)

(56) References Cited

U.S. PATENT DOCUMENTS 5,550,971 A * 8/1996 Brunner .............. G06F 17/3048
5,754,760 A   5/1998 Warfield
(Continued)

FOREIGN PATENT DOCUMENTS

CN    1704900 A    12/2005
CN    101405729 A   4/2009

OTHER PUBLICATIONS

Ali Mesbah et al., "Migrating multi-page web applications to single-page Ajax interfaces", 2007, IEEE, pp. 1-10.
(Continued)

*Primary Examiner* — Wei Y Zhen
*Assistant Examiner* — Lanny N Ung
(74) *Attorney, Agent, or Firm* — Schwegman Lundberg & Woessner, P.A.

(57) ABSTRACT

This disclosure describes a user interface (UI) conceptual model and a data model for quickly and easily developing and managing a GUI. The present methods and systems described herein provide for defining one or more UI elements in the UI conceptual model. The one or more UI elements may further reference one or more model objects in the data model. The one or more model objects may include one or more tasks, which may each be mapped to one or more commands for performing each task, or one or more data items, which may each be mapped to rules or conditions for transforming data. According to embodiments, graphics or functionality of a GUI may be easily and efficiently modified by adding, deleting, or modifying UI elements in the UI conceptual model or by adding, deleting,
(Continued)

or modifying referenced model objects in the data model, thereby reducing management and development costs.

14 Claims, 7 Drawing Sheets

Related U.S. Application Data continuation of application No. 13/028,050, filed on Feb. 15, 2011, now Pat. No. 9,141,403.

(51) Int. Cl.
    *G06F 9/451*     (2018.01)
    *G06F 3/0482*     (2013.01)
    *G06F 3/12*     (2006.01)
    *G06F 8/35*     (2018.01)
    *G06F 8/38*     (2018.01)
    *H04L 12/24*     (2006.01)

(52) U.S. Cl.
    CPC .............. *G06F 3/1246* (2013.01); *G06F 8/35* (2013.01); *G06F 8/38* (2013.01); *G06F 9/451* (2018.02); *H04L 41/22* (2013.01)

(58) Field of Classification Search
    USPC .......................................................... 717/104
    See application file for complete search history.

(56) References Cited

U.S. PATENT DOCUMENTS

| | | | |
|---|---|---|---|
| 6,668,354 | B1 | 12/2003 | Chen et al. |
| 6,823,460 | B1 | 11/2004 | Hollander et al. |
| 6,941,521 | B2* | 9/2005 | Lin ........................... G06F 8/38 715/234 |
| 7,003,781 | B1 | 2/2006 | Blackwell et al. |
| 7,047,446 | B1 | 5/2006 | Maurer et al. |
| 7,231,210 | B1 | 6/2007 | Croak et al. |
| 7,243,344 | B2 | 7/2007 | Snover et al. |
| 7,694,271 | B2 | 4/2010 | Becker |
| 7,770,068 | B2 | 8/2010 | Drees |
| 7,958,497 | B1 | 6/2011 | Lindo et al. |
| 8,020,108 | B1 | 9/2011 | Roytman et al. |
| 8,401,987 | B2* | 3/2013 | Agrawal ........... G06F 17/30371 706/45 |
| 8,719,772 | B2 | 5/2014 | Singla |
| 9,141,403 | B2 | 9/2015 | Zhang et al. |
| 2004/0260718 | A1 | 12/2004 | Fedorov |
| 2005/0138646 | A1 | 6/2005 | Mese et al. |
| 2005/0187930 | A1 | 8/2005 | Subramanian et al. |
| 2006/0048136 | A1 | 3/2006 | Vries et al. |
| 2006/0075386 | A1 | 4/2006 | Loh et al. |
| 2006/0092846 | A1 | 5/2006 | Loh et al. |
| 2006/0136877 | A1 | 6/2006 | Gdaniec et al. |
| 2007/0083530 | A1 | 4/2007 | Lakshminath et al. |
| 2008/0083707 | A1 | 4/2008 | Schug |
| 2008/0256469 | A1 | 10/2008 | Jain et al. |
| 2009/0024551 | A1 | 1/2009 | Agrawal et al. |
| 2009/0049403 | A1 | 2/2009 | Jones |
| 2009/0164983 | A1 | 6/2009 | Singla |
| 2009/0254881 | A1 | 10/2009 | Johnson et al. |
| 2010/0100868 | A1 | 4/2010 | Shukla et al. |
| 2011/0145748 | A1* | 6/2011 | Farver ....................... G06F 8/71 715/771 |
| 2011/0314370 | A1 | 12/2011 | Evans |
| 2012/0210256 | A1 | 8/2012 | Zhang et al. |
| 2015/0363079 | A1 | 12/2015 | Zhang et al. |

OTHER PUBLICATIONS

An extensible agent task language—creating scripts in the Hewlett-Packard New Wave environment—Retrieved Date: Dec. 29, 2010; URL: <http://findarticles.com/p/articles/mi_mOHPJ/i_n4_v40/ai_7577952/>; 2 pages.

Antony Courtney et al., "Genuinely Functional User Interfaces", 2001, pp. 41-69.
API monitor, http://web.archive.org/web/20060101003445/http://www.rohitab.com/apimonitor/ [Jun. 6, 2013 2:14:43 PM], 4 pgs.
API Monitor, URL: httn://www.rohitab.com/animonitor/index.html (retrieved on Feb. 17, 2011), 20 pages.
Chinese Notice of Allowance in Application 201210032695.2, dated Sep. 27, 2016, 4 pages.
Chinese Office Action in Application 201210032695.2, dated Apr. 26, 2016, 13 pgs.
Ellicotte Rusty Harold & W Scott Means, XML in a nutshell, O'Reilly Media Inc., 2004, 1 page.
Empower, Appendix 1, p. 5-4, Pure Software, Inc., Copyright 1995.
Empower, Appendix 1, p. 5-5, Pure Software, Inc., Copyright 1995.
Empower, Appendix 1. p. 5-1, Pure Software, Inc., Copyright 1995.
Hunt, et al., "Detours: Binary Interception ofWin32 Functions"; Proceedings of the 3 USENIX Windows NT Symposium; Seattle, Washington (Jul. 12-13, 1999); 10 pages.
Krzysztof Gajos et al., "SUPPLE: Automatically Generating User Interfaces", Jan. 2004, pp. 93-100.
McFedries, Paul, The Unauthorized Guide to Windows 98, Jun. 1999, Que, Second Edition, 137.
Michael Kassoff et al., "Creating GU is for Web Services", 2003, IEEE, pp. 1-8.
New Features in Lync Server 2010,—Published Date: Jun. 2010; URL: <http://technet.microsoft.com/en-us/library/ff793475.aspx>; 6 pages.
Silverlight 3 Enables Data-Driven App Dev—Published Date: 2009; URL: <http://visualstudiomagazine.com/articles/2009/05/01/silverlight-3-enables-datadriven-a1212-dev.aspx>; 5 pages.
Steven, et al., "jRapture: A Capture/Replay Tool for Observation-Based Testing"; 2000 International Symposium on Software Testing and Analysis; Portland, Oregon (Aug. 2000); pp. 158-167.
U.S. Appl. No. 11/959,483, Amendment and Response filed Dec. 28, 2012, 17 pgs.
U.S. Appl. No. 11/959,483, Advisory Action dated Oct. 8, 2013, 3 pgs.
U.S. Appl. No. 11/959,483, Amendment and Response filed Oct. 31, 2011, 15 pgs.
U.S. Appl. No. 11/959,483, Amendment and Response filed Nov. 20, 2013, 15 pgs.
U.S. Appl. No. 11/959,483, Amendment and Response filed Feb. 28, 2012, 15 pgs.
U.S. Appl. No. 11/959,483, Amendment and Response filed May 28, 2013, 14 pgs.
U.S. Appl. No. 11/959,483, Amendment and Response filed Jun. 30, 2011, 14 pgs.
U.S. Appl. No. 11/959,483, Amendment and Response filed Aug. 23, 2012, 17 pgs.
U.S. Appl. No. 11/959,483, Amendment and Response filed Sep. 19, 2013, 16 pgs.
U.S. Appl. No. 11/959,483, Notice of Allowance dated Dec. 16, 2013, 11 pgs.
U.S. Appl. No. 11/959,483, Office Action dated Nov. 28, 2011, 17 pgs.
U.S. Appl. No. 11/959,483, Office Action dated Feb. 28, 2013, 29 pgs.
U.S. Appl. No. 11/959,483, Office Action dated May 20, 2011, 12 pgs.
U.S. Appl. No. 11/959,483, Office Action dated May 23, 2012, 22 pgs.
U.S. Appl. No. 11/959,483, Office Action dated Jul. 29, 2011, 16 pgs.
U.S. Appl. No. 11/959,483, Office Action dated Aug. 14, 2013, 31 pgs.
U.S. Appl. No. 11/959,483, Office Action dated Sep. 28, 2012, 26 pgs.
U.S. Appl. No. 13/028,050, Amendment and Response filed Oct. 18, 2013, 11 pgs.
U.S. Appl. No. 13/028,050, Amendment and Response filed Mar. 3, 2014, 13 pgs.
U.S. Appl. No. 13/028,050, Notice of Allowance dated Jan. 26, 2015, 9 pgs.

(56) References Cited

OTHER PUBLICATIONS

U.S. Appl. No. 13/028,050, Notice of Allowance dated May 20, 2015, 8 pgs.
U.S. Appl. No. 13/028,050, Office Action dated Dec. 2, 2013, 14 pgs.
U.S. Appl. No. 13/028,050, Office Action dated Jul. 18, 2013, 11 pgs.
U.S. Appl. No. 14/837,789, Amendment after Allowance filed Jan. 26, 2017, 8 pgs.
U.S. Appl. No. 14/837,789, Notice of Allowance dated Dec. 27, 2016, 12 pgs.
Using GUI to script PowerShell with PowerGUI—Published Date: Mar. 18, 2010; URL: <http://www.windowsnetworking.com/articles_tutorials/Using-GUI-script-PowerShell-PowerGUI.html>; 14 pages.
Web Server (IIS) Role, Updated Jan. 21, 2008, URL: http://technet2.Microsoftcom/WindowsServer2008/en/librarv/8fl 6760d-176a-4487-b 165-5c4dccc87 lc4 1 033.mspx, 7 pages.
Windows PowerShell Integrated Scripting Environment Overview—Retrieved Date: Dec. 29, 2010; URL: <http://technet.microsoft.com/en-us/library/dd759217.aspx>; 2 pages.

\* cited by examiner

DATA-DRIVEN SCHEMA FOR DESCRIBING AND EXECUTING MANAGEMENT TASKS IN A GRAPHICAL USER INTERFACE

CROSS-REFERENCE TO RELATED APPLICATIONS

This application is a continuation application of U.S. patent application Ser. No. 14/837,789, entitled "DATA-DRIVEN SCHEMA FOR DESCRIBING AND EXECUTING MANAGEMENT TASKS IN A GRAPHICAL USER INTERFACE," filed on Aug. 27, 2015, which application is a continuation application of U.S. patent application Ser. No. 13/028,050 (now U.S. Pat. No. 9,141,403), filed on Feb. 15, 2011, the entire disclosures of which are hereby incorporated herein by reference.

INTRODUCTION

Functionality and graphical effects of a graphical user interface (GUI) are provided based on code underlying each page of the GUI. Furthermore, development and management of GUIs, e.g., interfaces associated with websites or otherwise, may involve manipulations of the underlying code. As a result, adding, removing, or modifying the functionality or graphical effects of a website may require substantial technical experience, time, and expense. Furthermore, inconsistencies in the GUI may arise due to variations in the underlying code resulting from modifications implemented, for example, at different times, by different technicians, etc.

It is with respect to this general environment that the present disclosure is directed.

SUMMARY

This disclosure describes a user interface (UI) conceptual model and a data model for quickly and easily developing and managing a GUI associated with a website or otherwise. Specifically, the present methods and systems described herein provide for defining one or more UI elements in the UI conceptual model. The one or more UI elements may further reference one or more model objects in the data model. The one or more model objects may include one or more management tasks, which may be mapped to one or more commands for performing the management tasks, or one or more data items, which may be mapped to one or more rules or conditions for transforming data. Thus, a UI element may provide functionality to a GUI by referencing one or more model objects. According to embodiments, functionality may then be easily and efficiently added or removed from a GUI by adding or removing a UI element. Furthermore, modifications to the UI element or referenced model objects may easily and efficiently cause modifications to the functionality available on the GUI. As a result, the development and management costs for maintaining a GUI may be substantially reduced.

According to embodiments, a computer storage medium storing computer-executable instructions for implementing a method of managing a graphical user interface (GUI) is provided. The method comprises providing a data model that comprises a model object, wherein the model object comprises at least a first task mapped to a first command for performing the first task, and providing a user interface (UI) conceptual model that describes at least one UI element for managing the GUI, wherein the at least one UI element references the model object. Further, the method comprises adding the at least one UI element to a page definition of the UI conceptual model and rendering the at least one UI element on a corresponding page of the GUI, wherein functionality associated with the corresponding page of the GUI is modified upon rendering the at least one UI element. Further, the method comprises activating the at least one rendered UI element, wherein activating the at least one rendered UI element includes executing the first task.

According to further embodiments, a computer system is provided for performing a method of managing a graphical user interface (GUI). The method comprises providing a data model that comprises a model object, wherein the model object comprises at least a first task mapped to a first command for performing the first task, and providing a user interface (UI) conceptual model that describes at least one UI element for managing the GUI, wherein the at least one UI element references the model object. Further, the method comprises adding the at least one UI element to a page definition of the UI conceptual model and rendering the at least one UI element on a corresponding page of the GUI, wherein functionality associated with the corresponding page of the GUI is modified upon rendering the at least one UI element. Further, the method comprises activating the at least one rendered UI element, wherein activating the at least one rendered UI element includes executing the first task.

According to further embodiments, a computer-implemented method is provided for managing a graphical user interface (GUI). The method comprises providing a data model that comprises a model object, wherein the model object comprises at least a first task mapped to a first command for performing the first task, and providing a user interface (UI) conceptual model that describes at least one UI element for managing the GUI, wherein the at least one UI element references the model object. Further, the method comprises adding the at least one UI element to a page definition of the UI conceptual model and rendering the at least one UI element on a corresponding page of the GUI, wherein functionality associated with the corresponding page of the GUI is modified upon rendering the at least one UI element. Further, the method comprises activating the at least one rendered UI element, wherein activating the at least one rendered UI element includes executing the first task.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims herein as well as the appended drawings.

It is to be understood that both the foregoing general description and the following detailed description are exemplary and explanatory and are intended to provide further explanation for the appended claims.

DETAILED DESCRIPTION

Although the methods and user interface introduced above and discussed in detail below may be useful in a variety of development and management applications, the present disclosure will discuss the implementation of these techniques for use with developing and managing a GUI. The technology described in the context of UI conceptual and data models could be adapted for use with other computer languages requiring simplified and intuitive creation and management of graphical user interfaces or website interfaces.

This disclosure describes a user interface (UI) conceptual model and a data model for quickly and easily developing and managing a GUI associated with a website or otherwise. Specifically, the present methods and systems described herein provide for defining one or more UI elements in the UI conceptual model. The one or more UI elements may further reference one or more model objects in the data model. The one or more model objects may include one or more management tasks, which may be mapped to one or more commands for performing the management tasks, or one or more data items, which may be mapped to one or more rules or conditions for transforming data. Thus, a UI element may provide functionality to a GUI by referencing one or more model objects. According to embodiments, functionality may then be easily and efficiently added or removed from a GUI by adding or removing a UI element. Furthermore, modifications to the UI element or referenced model objects may easily and efficiently cause modifications to the functionality available on the GUI. As a result, the development and management costs for maintaining a GUI may be substantially reduced.

Figure 1:
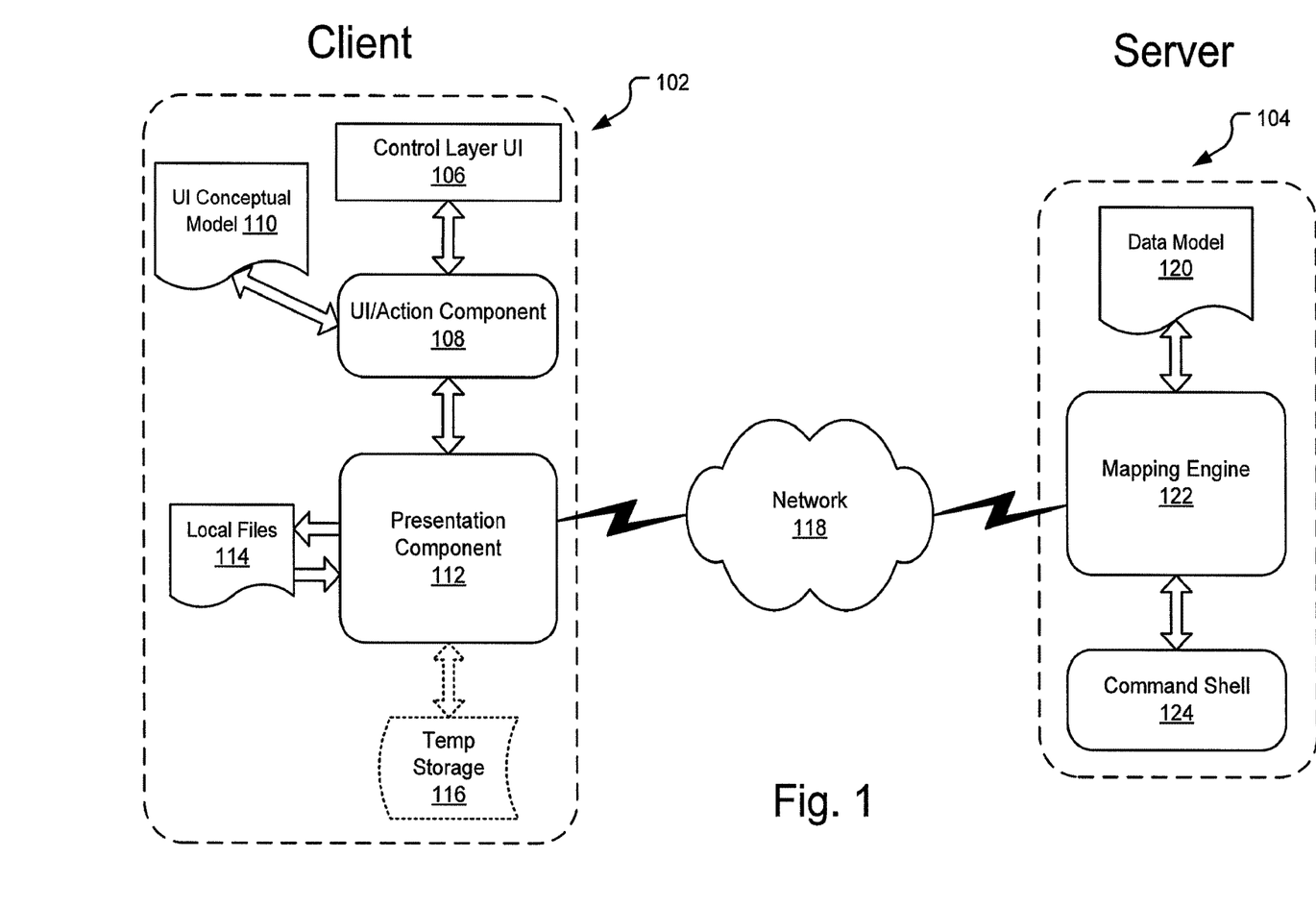
FIG. 1 is an illustration of an embodiment of a suitable client/server computing system for managing a GUI.

FIG. 1 is an illustration of an embodiment of a suitable client/server computing system for managing a graphical user interface (GUI).

According to embodiments of the present disclosure, the methods disclosed herein may be implemented on a client/server computing system. For example, client 102 and server 104 may comprise various computing modules, sub-modules, components, etc., for managing a GUI. Indeed, functional steps, operations, methods, etc., as described herein may be conducted by any suitable combination of hardware and software on client 102 or server 104.

For example, client 102 may include control layer UI 106. Control layer UI 106 may be in communication with various input and output devices to enable a user to communicate with client 102. Furthermore, control layer UI 106 may be specialized for presentation of a GUI to a user based on the UI conceptual model 110, described further below. For example, a display module may be configured to communicate with control layer UI 106 for providing the GUI to the user. The GUI may be an interactive display, e.g., a touch-sensitive screen or otherwise, and may provide various windows and elements for receiving input and interface command operations. Alternatively, other suitable means of communication with control layer UI 106 may be provided, for instance by a keyboard, a mouse, a pen, a sound input device, a touch input device, or other suitable interactive device. For example, control layer UI 106 may accept commands and other input from a user associated with the GUI.

In addition to providing an interface for communication with a user, the control layer UI 106 may also be in communication with a UI/Action component 108. For example, UI/Action component 108 may be associated with one or more processors (e.g., processor 206 illustrated in FIG. 2) and may be specialized for processing a UI conceptual model 110 for communicating UI elements to the control layer UI 106 or a presentation component 112. The UI conceptual model 110 may be exposed, loaded, or otherwise available on client 102, but may also be stored or otherwise available on server 104. For example, UI elements within the UI conceptual model 110 may be added, deleted, modified, etc., via development tools, wizards, or other development systems associated with or in communication with server 104.

According to embodiments, the UI conceptual model may be provided in a markup language. In general, markup languages specify instructions regarding the structure and attributes for presenting a document or web page. Common markup languages include, among others, Standard Generalized Markup Language (SGML), HyperText Markup Language (HTML), and Extensible Markup Language (XML). HTML is widely used as one of the formatting languages for displaying web pages on the World Wide Web and provides standardized, predefined presentation semantics regarding how structured data is presented. That is, HTML provides building blocks for creating the presentation appearance of web pages, allowing embedded images, objects, scripts, and interactive elements and providing text presentation semantics for rendering headings, paragraphs, lists, quotes, hyperlinks, etc., for presentation on web pages. XML is also widely used for displaying documents and other structured data on web pages, but does not provide predefined presentation semantics. That is, XML also provides building blocks for creating the presentation appearance of web pages, but it provides flexibility over HTML by enabling customization of presentation semantics.

According to embodiments, the UI conceptual model 110 may be provided in XML. That is, the UI conceptual model 110 may comprise a page definition in terms of XML markup and content for each page of a GUI. Furthermore, each page definition in the UI conceptual model 110 may comprise one or more UI elements and each UI element may be defined in the UI conceptual model 110 in terms of XML markup and content. Each UI element may be referenced by multiple page definitions to promote consistency and efficiency in the coding of the GUI. According to some embodiments, common UI elements may be provided as XML macros. According to embodiments, a UI element may be easily added to a page definition by simply adding a reference to the UI element or by cutting and pasting the XML definition of the UI element into the page definition. Upon adding the UI element to a page definition, the UI element may be rendered on a corresponding page of the GUI, as described further with reference to FIG. 3. According to additional embodiments, a UI element may be modified by simply changing the XML definition of the UI element in the UI conceptual model 110. As such, according to some embodiments, all references to the modified UI element may be automatically updated without recoding each page of the GUI or, according to other embodiments, the modified UI element may be easily copied and pasted into each appropriate page definition within the UI conceptual model 110.

According to further embodiments, an XML schema may be provided for validation of the UI elements. That is, according to embodiments, XML may define a visual presentation and any associated functionality, content, etc. of UI elements for display on the GUI. Furthermore, where a particular UI element allows for input (e.g., a URL address), the input may be validated against the XML schema to ensure that the format, syntax, etc., of the input conforms to a valid format (e.g., valid URL format and syntax). Alternatively, the input may be validated against restrictions such as max length, a range, etc., specified in the XML schema for the UI element.

As noted above, in addition to communicating with the control layer UI 106 and processing the UI conceptual model 110, the UI/Action component 108 may be in communication with the presentation component 112. According to embodiments, presentation component 112 may receive information regarding one or more UI elements from UI/Action component 108 (e.g., based on the UI conceptual model 110) and may render (or create) visual controls, event handlers, associated data sources and may bind controls for the one or more UI elements on the GUI. According to some embodiments, presentation component 112 may employ MICROSOFT SILVERLIGHT® controls for rendering a visual representation of the one or more UI elements on the GUI. According to alternative embodiments, presentation component 112 may employ user-embedded controls for rendering a visual representation of the one or more UI elements on the GUI. According to embodiments described herein, "rendering" refers to the creation and presentation of the one or more UI elements on the GUI for viewing by a user.

According to additional embodiments, presentation component 112 may communicate with system memory (e.g., system memory 204 illustrated in FIG. 2), removable storage (e.g., removable storage 208 illustrated in FIG. 2), non-removable storage (e.g., non-removable storage 210 illustrated in FIG. 2), etc., for implementing the above-mentioned aspects of the GUI. Such system memory or storage may include, for example, local files 114 or temporary storage 116.

Presentation component 112 may further be in communication with mapping engine 122 (e.g., on server 104) via a network 118 (e.g., intranet, internet, etc.). That is, based on user input, the presentation component 112 may retrieve transformed data, data resulting from executed tasks, etc., from mapping engine 122.

In addition to communicating with presentation component 112 via network 118, mapping engine 122 may also access a data model 120. According to embodiments, mapping engine 122 and the data model 120 may reside on server 104. However, according to some embodiments, mapping engine 122 and the data model 120 may be exposed, loaded, or otherwise available on client 102. The data model 120 may describe management tasks and data items. That is, the data model 120 may map management tasks to commands for executing the management tasks. According to embodiments described herein, a "management task" refers to any functional operation useful in managing a GUI, e.g., get, move, copy, etc. Furthermore, the words "task" and "management task" may be used interchangeably herein. The data model 120 may also map data items to rules or conditions for transforming data. According to embodiments described herein, a "data item" may refer to any collection of data (e.g., lists, policies, values, etc.) and "rules or conditions for transforming data" may refer to any manipulation of the collection of data, e.g., compose, convert, format, extract, etc. According to embodiments, the data model 120 may encapsulate a management task that is mapped to a command in a model object and may encapsulate a data item mapped to rules or conditions in a model object. According to further embodiments, the data model 120 may encapsulate a grouping of one or more management tasks or data items, or a combination thereof, in a model object.

According to embodiments, data model 120 may be provided in terms of a markup language, e.g., XML, as described above with reference to the UI conceptual model 110. In embodiments, a model object refers to a logical grouping of XML-defined management tasks or data items. The model object may be "encapsulated" by an XML start-tag and an XML end-tag. According to at least some embodiments, the XML start- and end-tags for a model object may be descriptive (e.g., specifying a particular management task, data item, or combination thereof).

According to embodiments, data model 120 may be in further communication with command shell 124, which provides the commands for executing the management tasks. Command shell 124 may be provided as MICROSOFT POWERSHELL®. That is, data model 120 may map management tasks to particular POWERSHELL cmdlets (pronounced "commandlets") for executing the management tasks. For example, POWERSHELL cmdlets may include, inter alia, commands such as "Get-Childltem," "Get-Content," "Copy-Item," "Move-Item," "Remove-Item," "Rename-Item," "Get-Location," "Write-Output," "Tee-Object," etc. For example, upon receiving an indication from the presentation component 112 regarding reading, writing, or executing a particular management task, the mapping engine 122 may interpret the data model 120 definition of the particular management task and may invoke the command for executing the particular management task at runtime via communicating with command shell 124. Furthermore, mapping engine 122 may execute any appropriate data transformation operations (e.g., composing, extracting, converting, etc.) specified by a particular data item associated with the particular management task and may provide the transformed data as input for invoking the particular management task via the command shell 124. According to some embodiments, the particular management task and the particular data item may be encapsulated in a particular model object.

As may be appreciated, the disclosed components and models are not to be understood as an exclusive array, as any number of similar suitable components or models may be employed within the spirit of the present disclosure. Further, the disclosed components, engines, and models are not to be understood as a necessary array, as any number of the disclosed components or models may be appropriately replaced by other suitable components or models without departing from the spirit of the present disclosure. The illustrated embodiments for developing, managing, or rendering a GUI are provided for purposes of example only.

Figure 2:
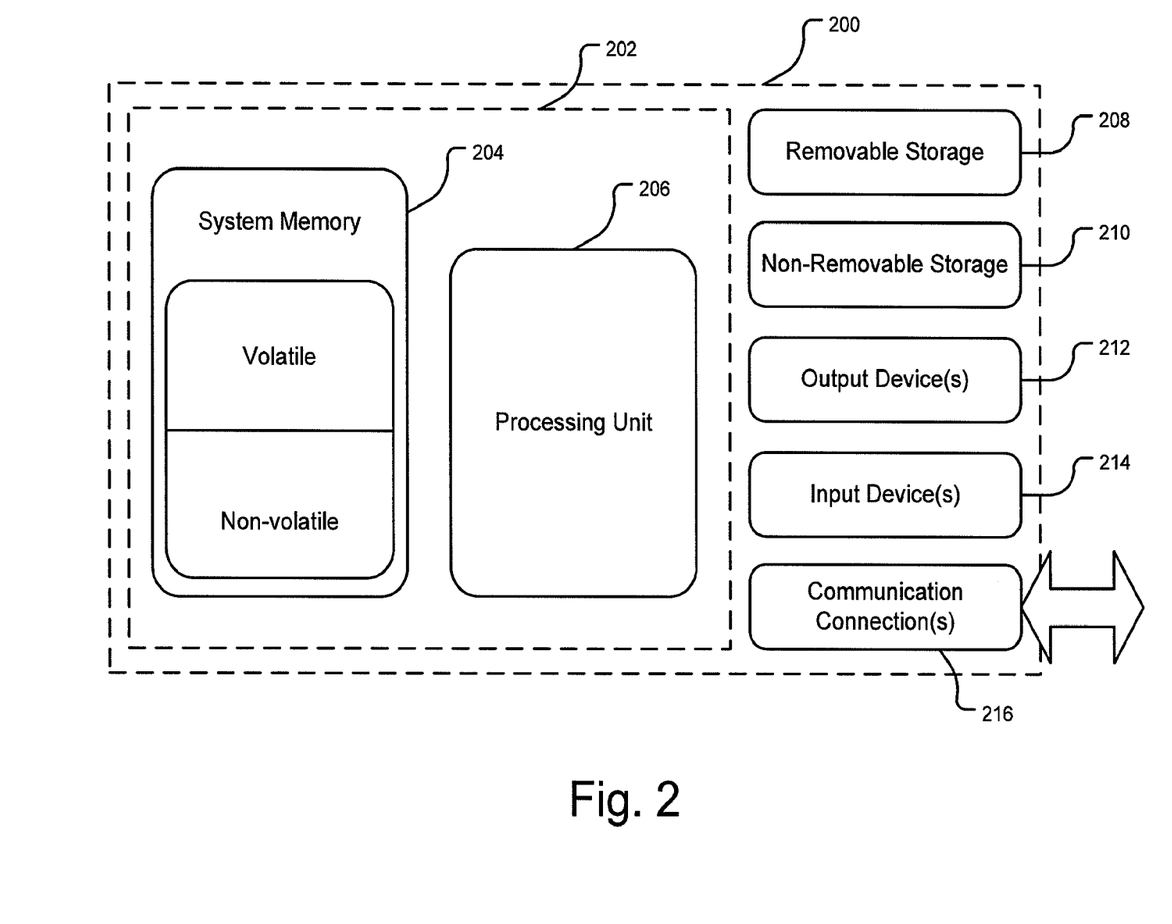
FIG. 2 is a block diagram illustrating an embodiment of a suitable computer system for implementing one or more aspects of the management of a GUI.

FIG. 2 is a block diagram illustrating an embodiment of a suitable computer system for implementing one or more aspects of the management of a GUI.

FIG. 2 illustrates an example computer system 200 upon which embodiments disclosed herein may be implemented.

Computer system 200, such as client 102 or server 104 as shown in FIG. 1, for example, has at least one processor 206 for managing a GUI associated with control layer UI 106, UI/Action component 108, presentation component 112, mapping engine 122, command shell 124, etc., as shown in FIG. 1. Computer system 200 has system memory 204 comprising, for example, volatile memory and non-volatile memory. For example, UI conceptual model 110 may be stored in non-volatile memory either on a client (e.g., client 102) or a server (e.g., server 104). In its most basic configuration, computer system 200 is illustrated in FIG. 2 by dashed line 202. According to embodiments, computer system 200 may include additional storage (removable or non-removable) including, but not limited to, magnetic or optical disks or tape. Such additional storage is illustrated in FIG. 2 by removable storage 208 and non-removable storage 210, e.g., temporary storage 116.

The term computer readable media as used herein may include computer storage media. Computer storage media may include volatile and nonvolatile, removable and non-removable media implemented in any method or technology for storage of information, such as computer readable instructions, data structures, program modules, or other data. System memory 204, removable storage 208, and non-removable storage 210 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computer system 200. Any such computer storage media may be part of computer system 200. Computer system 200 may also have input device(s) 214 such as a keyboard, a mouse, a pen, a sound input device, a touch input device, etc. Output device(s) 212 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer system 200 may also contain communications connection(s) 216 that allow the device to communicate with other devices, e.g., via network 118. For example, specialized control layer UI 106 and specialized UI/Action component 108 may be provided on client 102 for presenting the GUI to a user. Furthermore, various components of the client 102, e.g., presentation component 112, may communicate via communication connection(s) 216 with server 104 in order to provide at least some GUI functionality and to facilitate at least some user interactivity with the GUI (e.g., execute tasks and return results, return transformed data, validate user input, etc.).

Figure 3:
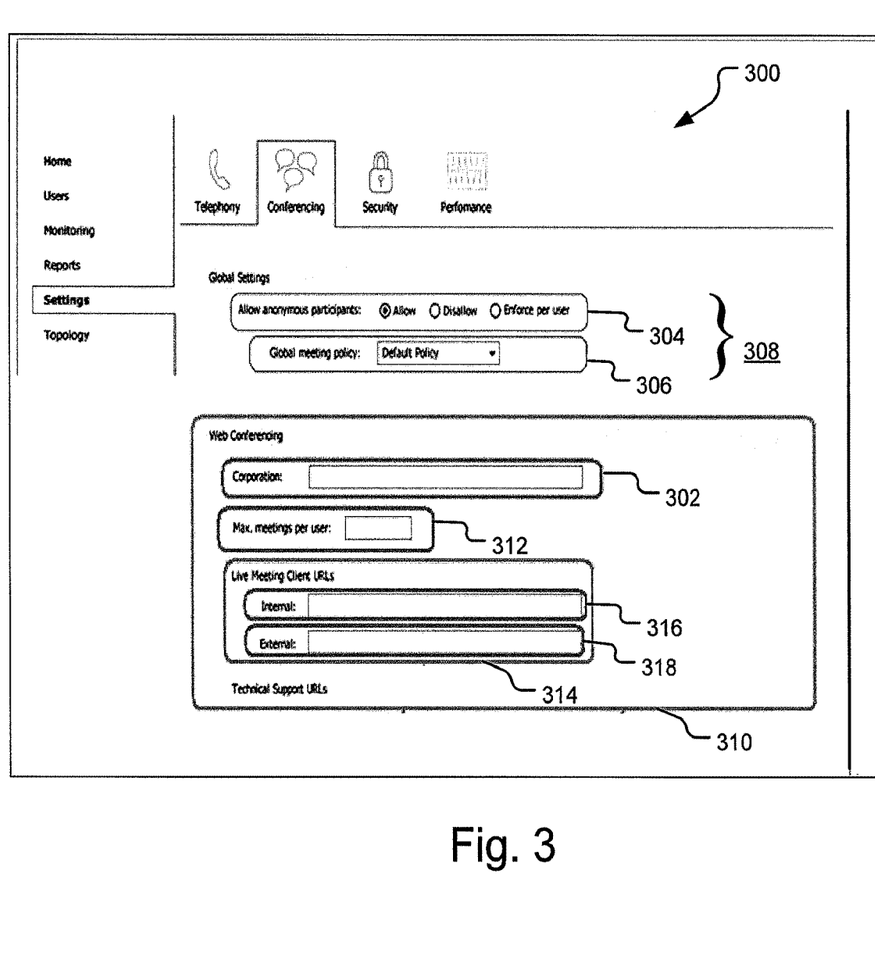
FIG. 3 is an illustration of a GUI displaying embodiments of single selection UI elements and header group UI elements on the GUI.

FIG. 3 is an illustration of a GUI displaying embodiments of rendered UI elements, including single selection UI elements and header group UI elements, on the GUI.

FIG. 3 provides an example of GUI 300 with one or more rendered UI elements. For example, the GUI 300 as illustrated in FIG. 3 may be presented by a control layer UI, e.g., control layer UI 106, on a display. In this example embodiment, the GUI 300 is an administrator GUI for setting policy conferencing; however, the present disclosure is applicable to other GUIs as well. According to embodiments, the term "rendered" UI element refers to a UI element as it appears on a GUI, e.g., GUI 300 (as opposed to how it may be described in the UI conceptual model 110). According to embodiments, rendered UI elements may include, inter alia, display UI elements, single selection UI elements, input UI elements, and header group UI elements. Furthermore, header group UI elements may comprise any combination of display UI elements, single selection UI elements, input UI elements, and other header group UI elements.

As provided above, according to embodiments, rendered UI elements as described herein may include display UI elements. Display UI elements may include non-interactive UI elements, such as text display elements (e.g., text boxes, titles, etc.), graphical display elements (images, banners, borders, symbols, graphics, etc.), and any other suitable display UI element for presentation on a GUI.

According to additional embodiments, rendered UI elements may include input UI elements. Input UI elements may include a descriptive label and may provide an entry field or other suitable input window for accepting direct user input corresponding to the descriptive label. For example, input UI element 302 provides an entry field for accepting user input regarding the descriptive label "Corporation." According to some embodiments, input UI elements may be configured with default input or default settings whereby input may be automatically imported into an entry field. According to further embodiments, input UI elements may reference an XML schema and upon user input, the input may be validated against the XML schema, as described above. Input UI elements may further comprise various UI control elements (e.g., buttons, tabs, etc.) for accepting user input. For example, a user may provide input by activating or otherwise selecting a button or tab on a GUI and may thereby convey a desire to view an alternate page of the GUI, to view additional available information, to respond to a prompt, etc.

According to additional embodiments, rendered UI elements may include single selection UI elements. A single selection UI element may correspond to an element having a descriptive label and a dropdown menu, radio box, etc., for selecting one or more options associated with the descriptive label. For example, single selection UI element 304 has a descriptive label of "Allow anonymous participants" and a radio box for selecting corresponding options including "Allow," "Disallow," and "Enforce per user." In contrast, single selection UI element 306 has a descriptive label of "Global meeting policy" and a dropdown menu for selecting options corresponding to the global meeting policy ("Default Policy" is illustrated as a default selection). According to embodiments, a single selection UI element may be associated with any suitable descriptive label and with any suitable array of selectable options corresponding to the descriptive label.

According to additional embodiments, rendered UI elements may include header group UI elements. Header group UI elements may correspond to any combination of display UI elements, single selection UI elements, direct input UI elements, and other header group UI elements under a common heading. For example, single selection UI element 304 and single selection UI element 306 fall under header group UI element 308 under common header "Global Settings." In contrast, header group UI element 310 comprises a combination of input and header group UI elements under the common header "Web Conferencing." Specifically, header group UI element 310 includes input UI element 302, input element 312, and header group UI element 314. Header group UI element 314 further comprises input UI elements 316 and 318.

According to embodiments, the rendered UI elements may be displayed on a GUI, e.g., GUI 300, based on instructions defined in or referenced by a UI conceptual model, e.g., UI conceptual model 110. For example, according to embodiments, a UI element may be defined in the UI conceptual model 110 by a label description (e.g., "Allow Anonymous," "Global Settings," or an abbreviation thereof). Furthermore, in the case of a single selection UI element, the UI element may be defined by a style of selection (e.g., radio box or dropdown). According to further embodiments, a UI element may be bound to various lists and values (e.g., policy lists, current policies, etc.). A UI element may be further defined by various global attributes of a UI page such as a style class (e.g., "flat button"), a layout (e.g., vertical or horizontal), a page label (e.g., conference policy page), a data source (e.g., conference settings), a group header label (e.g., global settings), etc. According to further embodiments, a UI element may reference one or more management tasks or data items defined in a data model, e.g., data model 120.

For example, the following is an example of an XML definition for a UI element corresponding to rendered single selection UI element 304 within header group UI element 308 on a conference policy page of a GUI (XML definition for single selection UI element 306 not shown):

```
<UIPart ID="confpolicypage" Layout="vertical"
Datasource="DS_ConfSetting">
    <HeaderGroup Label="Global Settings">
        <SingleSelection StyleClass="RadioBox"
        Label="*res:idsAllowAnony"
            List="*Bind:AnonyPolicyList"
            Value="*Bind:CurAnonyPolicy">
            <ItemTemplate ForType="DS_CommonItem">
                <SelectionItem Label="*Bind:Label"
                Value="*Bind:Value" />
            </ItemTemplate>
        </SingleSelection>
        ...
    </HeaderGroup>
```

That is, according to embodiments, based on the definition provided in the UI conceptual model, a hierarchy of relationships may be established for each UI element. For example, styles (e.g., radio box), references to management tasks (e.g., "get" current policy), references to data items (e.g., extract, reformat data), etc., associated with a single selection UI element may be grouped under a single selection label. A single selection UI element may further be grouped under a header group label. A header group UI element may be grouped under another header group label. Header group UI elements or single selection UI elements may be grouped under a UI page label (e.g., conference policy page), and so on. According to embodiments, one or more hierarchical groupings associated with one or more UI elements may be copied into the definition of a page or deleted from the definition of a page in the UI conceptual model. For example, according to embodiments, an administrator or other user may request additions, deletions, or changes to a GUI. The UI conceptual model may then be accessed and the requested changes may be made in the XML definition. For example, the definition of the UI element may be copied and pasted into another page, the definition of the UI element may be deleted from a page, the definition of the UI element may be modified, etc. Accordingly, the GUI may be modified without recoding, developing and managing the GUI is greatly simplified, reducing costs, and promoting consistency and stability for the GUI, improving user satisfaction. According to further embodiments, modifications may be made to the definitions of management tasks or data items in the data model. Thereafter, references to the modified management tasks or data items may be automatically updated. As such, the present disclosure provides for easily and efficiently adding, removing, or modifying the one or more UI elements, which promotes consistency, efficiency, and simplicity in developing, managing, and maintaining a GUI.

As should be appreciated, particular examples provided herein are for explanatory purposes only and a UI element may be defined by any number of suitable attributes according to the spirit of the present application.

Figure 4:
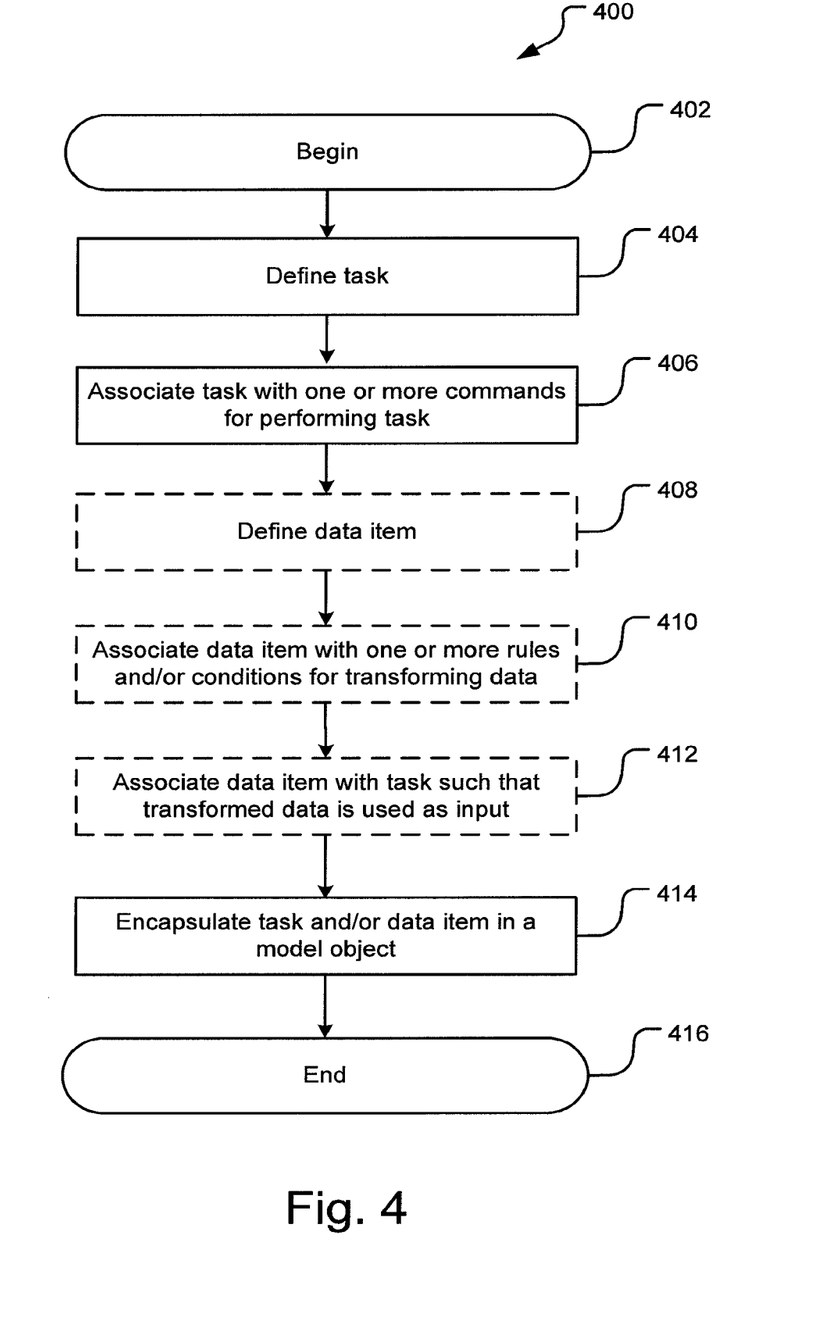
FIG. 4 is a flow diagram representing an embodiment of a method for defining a task and a data item and encapsulating the task or data item in a model object.

FIG. 4 is a flow diagram representing an embodiment of a method for defining a task and, optionally, a data item and encapsulating the task or data item in a model object.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

According to some embodiments, some or all of the method of FIG. 4 may be preferably implemented on a server, e.g., server 104. According to alternative embodiments, some or all of the method of FIG. 4 may be implemented on a client, e.g., client 102. Further, the method of FIG. 4 may be performed with respect to defining a data model, e.g., data model 120. According to some embodiments, the method of FIG. 4 may be conducted with the aid of development tools, e.g., wizards, drag and drop functionality, cut and paste functionality, or any other suitable development or management technology.

The method of FIG. 4 begins with begin operation 402. Begin operation 402 may refer to any suitable initiation of a method for defining a management task or a data item within a data model. For example, begin operation 402 may involve accessing or initiating one or more development tools. According to embodiments, the management task may not be the first management task defined within the data model. According to further embodiments, the method of defining a management task or a data item may be performed using a markup language, e.g., XML.

At define task operation 404, a task may be described or otherwise identified within the data model, e.g. via a task label using XML. Furthermore, the task may be associated other tasks or may be defined as a set of other tasks within the data model. For example, a "restart" task may be defined as a "stop" task and a "start" task. Alternatively, a "get all users" task may be associated with a "get active users" task and a "get inactive users" task.

At associate command operation 406, a task may be associated with or mapped to one or more commands for performing the task in the data model. For example, as described above, the task may be mapped to a command shell command for performing the task. In this example, although other command shells are within the scope of the present disclosure, the command shell (e.g., command shell 124) is assumed to be provided by MICROSOFT POWER-SHELL. For example, a "get all users" task may be mapped to a POWERSHELL command such as "Get-UserItem" (or any other appropriate command for returning all users from a database). Upon user input, for example, a mapping engine (e.g., mapping engine 122) may interpret the data model definition for the task and may invoke an appropriate command on a POWERSHELL component, e.g., command shell 124. Thereafter, for example, the mapping engine may return the result of the task to a presentation component (e.g., presentation component 112).

At optional define data item operation 408 (identified by dotted lines), a data item may be optionally defined or described within a data model. For example, a data item may be described for converting user input into a particular format. For example, where user input involves a date, a data item may be defined for converting the date into a computer-readable format (e.g., binary). Alternatively, a data item may be defined for converting the date into a standard format (e.g., from dd/mm/yy to dd/mm/yyyy). Indeed, a data item may be defined for any manipulation of data useful or necessary to the implementation of a GUI, as described herein.

At optional associate rules operation 410 (identified by dotted lines), the data item may be associated or mapped to one or more rules or conditions for transforming data in the data model. The rules or conditions may refer to any operation suitable for performing the data transformation specified by the data item. For example, a data item may be mapped to an operation for converting data to a computer-readable form (e.g., binary) or to a standardized format (e.g., from dd/mm/yy to dd/mm/yyyy). Indeed, any suitable operation (i.e., involving any rule or condition) for transforming data may be mapped to the data item.

At optional associate tasks operation 412 (identified by dotted lines), the data item may be associated with or mapped to one or more tasks in the data model. According to embodiments, the data item may define a manipulation of data that results in transformed data used as input for the one or more associated tasks. For example, the user may input a date and the data item may transform the date into a standardized format, a binary format, etc. Thereafter, the standardized (or binary) date may be utilized as input for the task. According to this example, the task may involve identifying users in a database as "legacy users" before the standardized (or binary) date. According to other embodiments, the data item may define any manipulation of data such that the resulting transformed data may be used as input for the one or more associated tasks.

At encapsulate operation 414, the task may be encapsulated in a model object. According to embodiments, the task may be encapsulated by a descriptive XML start- and end-tag identifying the task. According to additional embodiments, the task may be encapsulated with additional tasks. For example, with reference to the "restart" task described above, XML start- and end-tags identifying the restart task may encapsulate XML start- and end-tags identifying a stop task and XML start- and end-tags identifying a start task. According to additional embodiments, the task may be encapsulated with one or more data items. In this case, the one or more data items may define manipulations of data for use as input for the task. For example, XML start- and end-tags identifying the task may encapsulate XML start- and end-tags identifying the data item. As such, a model object may correspond to an encapsulated task, an encapsulated data item, an encapsulated task including one or more encapsulated additional tasks, or an encapsulated task including one or more encapsulated data items, or any combination thereof. According to embodiments, a model item may be functionally independent such that it may be added or removed as a reference from a UI element in the UI conceptual model. According to additional embodiments, described further herein with reference to FIG. 6, a model object may be modified in the data model and may automatically update one or more UI elements referencing the model object in the UI conceptual model.

At end operation 416, the method of FIG. 4 may be terminated via any suitable means. For example, end operation 416 may involve closing the one or more development tools. According to embodiments, end operation 416 does not in any way prevent conducting begin operation 402 again at some future time.

Figure 5:
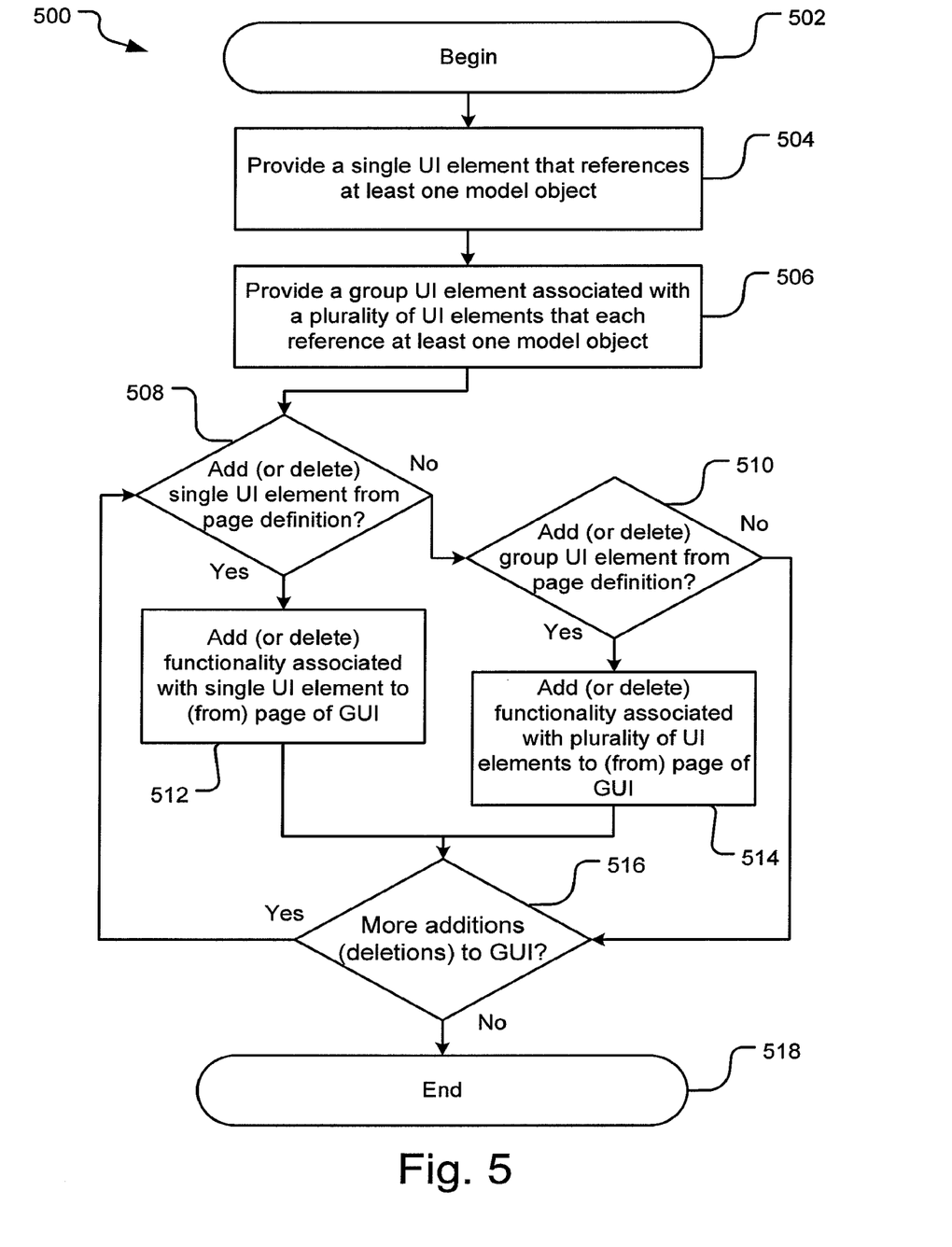
FIG. 5 is a flow diagram representing an embodiment of a method for providing and selecting a single UI element or a group UI element for managing a GUI.

FIG. 5 is a flow diagram representing an embodiment of a method for adding or deleting a single UI element or a group UI element from a page of a GUI.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

The method 500 of FIG. 5 begins with begin operation 502. Begin operation 502 may refer to any suitable initiation of a method for providing access to a single UI element (e.g., one of a single selection UI element, an input UI element, or a display UI element) and a group UI element (e.g., a header group UI element) in a UI conceptual model (e.g., UI conceptual model 110). According to embodiments, the UI conceptual model may be accessed via a development tool or otherwise in communication with a server, e.g., server 104. According to embodiments, the single and group UI elements may be provided in a markup language, e.g., XML, available via the development tool or otherwise to a user, such as a developer.

At provide single UI element operation 504, a single UI element may be provided, e.g., by display to a user. According to some embodiments, the single UI element may be provided by displaying the single UI element as part of a page definition of one or more other pages within the UI conceptual model, such as UI conceptual model 110. According to alternative embodiments, the single UI element may be provided via creating the single UI element using, for example, a development wizard. According to still other embodiments, the single UI element may be provided as an XML macro (e.g., for common single UI elements). According to further embodiments, a single UI element may be created and stored such that it may be reused. According to embodiments, a user (e.g. an administrator) may request functionality associated with the single UI element be added to or deleted from a GUI managed by the developer.

As described above, the single UI element may be a single selection UI element, an input UI element, or a display UI element, for example. Furthermore, the single UI element may reference at least one model object in a data model. According to embodiments described with reference to FIG. 5, a model object may comprise an encapsulated task, an encapsulated data item, an encapsulated task including one or more encapsulated additional tasks, or an encapsulated task including one or more encapsulated data items, or any combination thereof. Furthermore, each task comprised in a model object may be mapped to one or more commands for performing the task and each data item comprised in a model object may be mapped to one or more rules or conditions for transforming data.

At provide group UI element operation 506, a group UI element may be provided, e.g., by display to a user. According to some embodiments, the group UI element may be provided as part of a page definition of one or more other pages within the UI conceptual model. According to alternative embodiments, the group UI element may be provided via creating the group UI element using, for example, a development wizard. According to still other embodiments, the group UI element may be provided as an XML macro (e.g., for common group UI elements). According to embodiments, a user (e.g. an administrator) may request functionality associated with the group UI element be added to or deleted from a GUI managed by the developer.

As described above, the group UI element (or header group UI element) is UI element that comprises a plurality of single UI elements. That is, according to embodiments, a group UI element may include any combination of single selection UI elements, display UI elements, or input UI elements. As described above, each of the single UI elements may reference at least one model object in a data model. As such, each group UI element may reference a plurality of model objects in the data model.

At determination operation 508, the developer may determine whether to add (or delete) the single UI element to (or from) a page definition in the UI conceptual model. If the developer determines to add (or delete) the single UI element, the method may proceed to operation 512. Alternatively, if the developer determines not to add (or delete) the single UI element, the method may proceed to determination operation 510.

At determination operation 510, a determination is made whether to add (or delete) the group UI element to (or from) a page definition in the UI conceptual model. In embodiments, the determination is based on input received through a user interface. If it is determined to add (or delete) the group UI element, the method may proceed to operation 514. Alternatively, if it is determined not to add (or delete) the group UI element, the method may proceed to determination operation 516.

At add (or delete) operation 512, the single UI element may be added (or deleted) to (or from) the definition of a page in the UI conceptual model. In an embodiment, the single UI element (or a reference to the single UI element) may be added to the page definition by copy and paste or drag and drop methods, for example. Thereafter, according to embodiments, the added single UI element may be rendered on the page of the GUI. For example, according to embodiments a control layer UI in communication with a UI/Action component and a presentation component may render (or create) visual controls, event handlers, associated data sources, etc., of the added single UI element on the page of the GUI. According to some embodiments, MICROSOFT SILVERLIGHT® controls may be employed for rendering a visual representation of the added single UI element on the GUI. According to alternative embodiments, user embedded controls may be employed for rendering a visual representation of the added single UI element on the GUI.

Furthermore, according to embodiments, functionality associated with the at least one model object referenced by the added single UI element may be added to the page of the GUI. Thereafter, when the added single UI element is activated on the page of the GUI, a control layer UI (e.g., control layer UI 106) may communicate with a UI/Action component (e.g., UI/Action component 108), which may communicate with a presentation component (e.g., presentation component 112). The presentation component may communicate with a mapping engine (e.g., mapping engine 122) via a network (e.g., network 118). The mapping engine may interpret a data model (e.g., data model 120) comprising the referenced model object. The mapping engine may then invoke any task commands or data manipulations associated with the referenced model object. The mapping engine may return the results of the tasks or data items associated with the referenced model object to the presentation component, which may provide the results via the UI/Action component to the control layer UI for viewing on the page of the GUI. As such, the model object may provide functionality (e.g., via mapping a task to one or more commands for performing the task) or data transformation (e.g., via mapping a data item to one or more rules or conditions for transforming data) to the page of the GUI via merely copying and pasting the single UI element into the page definition in the UI conceptual model. In this way, functionality may be added to a page of the GUI without recoding the page, but by simply adding the single UI element (or a reference to the single UI element) to the page definition in the UI conceptual model.

Furthermore, in another embodiment, the single UI element (or a reference to the single UI element) may be deleted from a page definition in the UI conceptual model. As such, according to embodiments, the deleted single UI element may not be rendered on the page of the GUI. Furthermore, functionality associated with the at least one model object referenced by the single UI element may no longer be available on the page of the GUI. As such, functionality provided by a model object referenced by the single UI element (e.g., via mapping a task to one or more commands for performing the task) or data transformation (e.g., via mapping a data item to one or more rules or conditions for transforming data) may be removed from the page of the GUI via deleting the single UI element from the page definition in the UI conceptual model. In this way, functionality may be removed from the page of the GUI without recoding the page, but by simply deleting the single UI element (or a reference to the single UI element) from the page definition in the UI conceptual model.

At add (or delete) operation 514, the group UI element may be added (or deleted) to (or from) the definition of a page in the UI conceptual model. In an embodiment, the group UI element (or a reference to the group UI element) may be added to the page definition by copy and paste or drag and drop methods, for example. Thereafter, according to embodiments, the added group UI element may be rendered on the page of the GUI. For example, according to embodiments a control layer UI in communication with a UI/Action component and a presentation component may render (or create) visual controls, event handlers, associated data sources, etc., of each of the plurality of single UI element associated with the group UI element on the page of the GUI, as described above.

Furthermore, according to embodiments, functionality associated with the plurality of single UI elements associated with the group UI element may be added to the page of the GUI. That is, functionality associated with a plurality of model objects referenced by the plurality of single UI elements may be added to the page of the GUI. Thereafter, when the group UI element is activated on the UI page, a control layer UI may communicate with a UI/Action component, which may communicate with a presentation component, which may communicate with a mapping engine via a network. The mapping engine may interpret a data model comprising the referenced plurality of model objects. The mapping engine may then invoke any task commands or data manipulations associated with the referenced plurality of model objects. The mapping engine may then return the results of the tasks or data items associated with the referenced plurality of model objects to the presentation component, which may provide the results via the UI/Action component to the control layer UI for viewing on the page of the GUI. As such, the referenced plurality of model objects may provide functionality (e.g., via mapping each task to one or more commands for performing the task) or data transformation (e.g., via mapping each data item to one or more rules or conditions for transforming data) to the page of the GUI via merely copying and pasting the group UI element into the page definition in the UI conceptual model. In this way, functionality may be added to a page of the GUI without recoding the page, but by simply adding the group UI element (or a reference to the group UI element) to the page definition in the UI conceptual model.

Furthermore, according to another embodiment, the group UI element (or a reference to the group UI element) may be deleted from a page definition in the UI conceptual model. As such, according to embodiments, the deleted group UI element may not be rendered on the page of the GUI. Furthermore, functionality associated with a plurality of model objects referenced by a plurality of single UI elements associated with the group UI element may be deleted from the page of the GUI. As such, functionality provided by the referenced plurality of model objects (e.g., via mapping each task to a command for performing the task) or data transformation (e.g., via mapping each data item to rules or conditions for transforming data) may be removed from the page of the GUI via deleting the group UI element from the page definition in the UI conceptual model. In this way, functionality may be removed from the page of the GUI without recoding the page, but by simply deleting the group UI element (or a reference to the group UI element) from the page definition in the UI conceptual model.

At determination operation 516, a determination is made whether to conduct more additions or deletions to page definitions in the UI conceptual model. In embodiments, the determination is based on input received through a user interface. If it is determined to conduct more additions or deletions, the method may return to operation 508. Alternatively, if it is determined not to conduct more additions or deletions, the method may proceed to end operation 518.

At end operation 518, the method of FIG. 5 may be terminated via any suitable means. For example, end operation 518 may involve closing the one or more development tools. According to embodiments, end operation 518 does not in any way prevent conducting begin operation 502 again at some future time.

Figure 6:
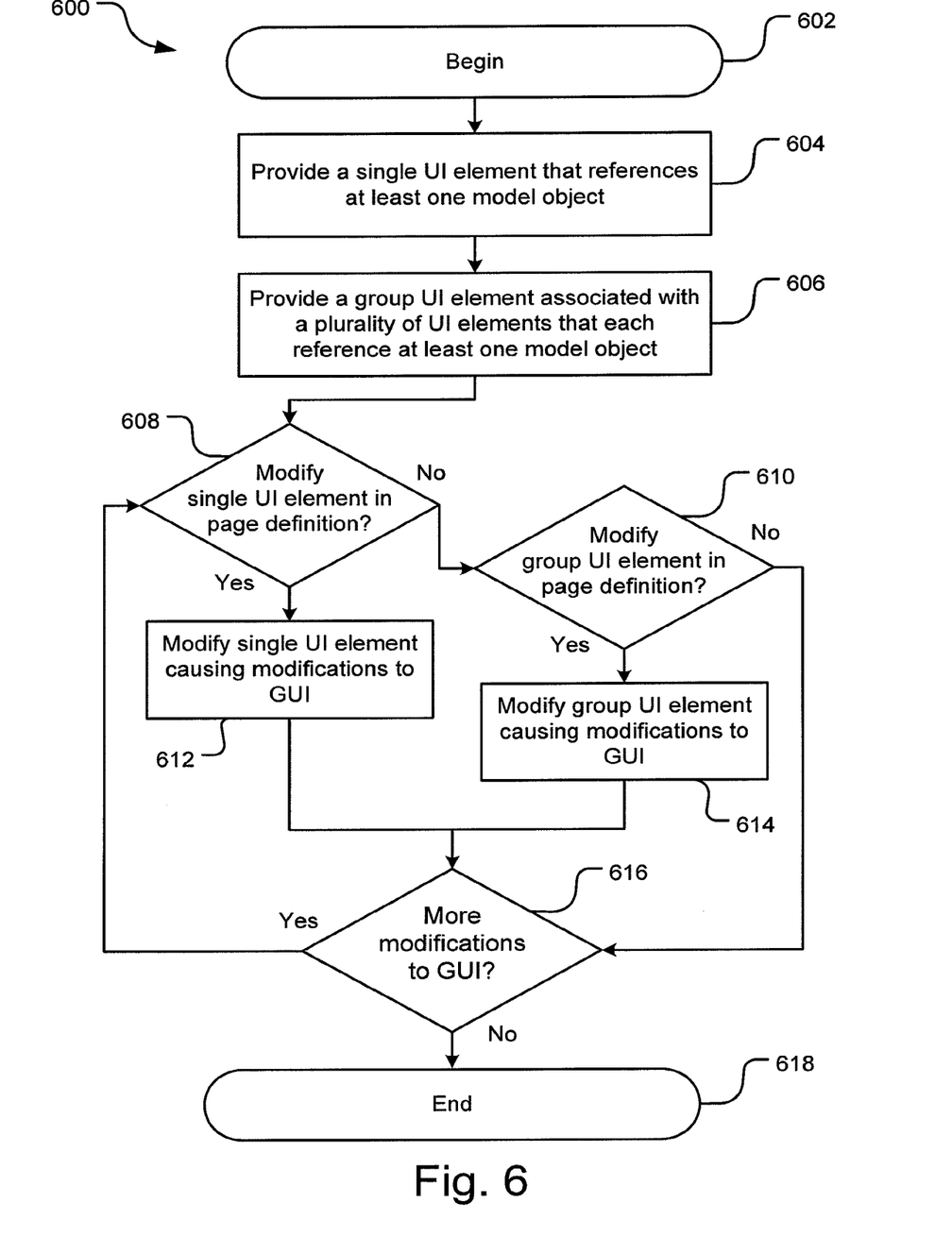
FIG. 6 is a flow diagram representing an embodiment of a method for modifying a UI element on a GUI.

FIG. 6 is a flow diagram representing an embodiment of a method for modifying a UI element within a UI conceptual model in order to modify a GUI.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

The method of FIG. 6 begins with begin operation 602. Begin operation 602 corresponds to begin operation 502, as described above.

At provide single UI element operation 604, a single UI element may be provided, as described above with reference to operation 504.

At provide group UI element operation 606, a group UI element may be provided, as described above with reference to operation 506.

At determination operation 608, a determination is made whether to modify a single UI element within the UI conceptual model. In embodiments, the determination is based on input received through a user interface. If it is determined to modify the single UI element, the method may proceed to operation 612. Alternatively, if it is determined not to modify the single UI element, the method may proceed to determination operation 610.

At determination operation 610, a determination is made whether to modify a group UI element within the UI conceptual model. In embodiments, the determination is based on input received through a user interface. If it is determined to modify the group UI element, the method may proceed to operation 614. Alternatively, if it is determined not to modify the group UI element, the method may proceed to determination operation 616.

At modify single UI element operation 612, the single UI element may be modified within the UI conceptual model. For example, the instructions for rendering the single UI element may be modified. Thereafter, according to embodiments, the modified single UI element may be rendered on the page of the GUI in a modified form. For example, the visual controls, event handlers, associated data sources, etc., of the modified single UI element may be modified on the GUI. Additionally or alternatively, references to one or more model objects associated with the single UI element may be added or deleted. As such, according to embodiments, functionality associated with the one or more model objects referenced by the single UI element may be added or deleted from the single UI element, modifying the single UI element and causing corresponding modifications to the GUI. According to embodiments, the definitions of one or more pages of the GUI may reference or include the single UI element. Thus, upon modifying the single UI element, the functionality available on the one or more pages of the GUI may thereby be modified. As such, by simply modifying the single UI element in the UI conceptual model, graphics or functionality may be modified on the GUI without recoding each of the one or more pages.

At modify group UI element operation 614, the group UI element may be modified within the UI conceptual model. For example, the instructions for rendering the group UI element may be modified. Thereafter, according to embodiments, the modified group UI element may be rendered on the page of the GUI in a modified form. Furthermore, according to embodiments, one or more single UI elements associated with the group UI element may be modified, as described above with reference to operation 612. Additionally or alternatively, one or more single UI elements may be added or removed from the group UI element. As a result, references to one or more model objects associated with the one or more single UI elements may be added or removed from the group UI element. Therefore, according to embodiments, functionality associated with the one or more referenced model objects may thereby be added or removed from the group UI element. According to embodiments, one or more page definitions within the UI conceptual model may reference or include the group UI element. Thus, upon modifying the group UI element, the graphics or functionality available on the one or more pages of the GUI may be thereby modified without recoding each of the one or more pages of the GUI.

At determination operation 616, a determination is made whether to conduct more modifications to the UI conceptual model. In embodiments, the determination is based on input received through a user interface. If it is determined to conduct more modifications, the method may return to operation 608. Alternatively, if it is determined not to conduct more modifications, the method may proceed to end operation 618.

At end operation 618, the method of FIG. 6 may be terminated via any suitable means. For example, end operation 618 may involve closing the one or more development tools. According to embodiments, end operation 618 does not in any way prevent conducting begin operation 502 again at some future time.

Figure 7:
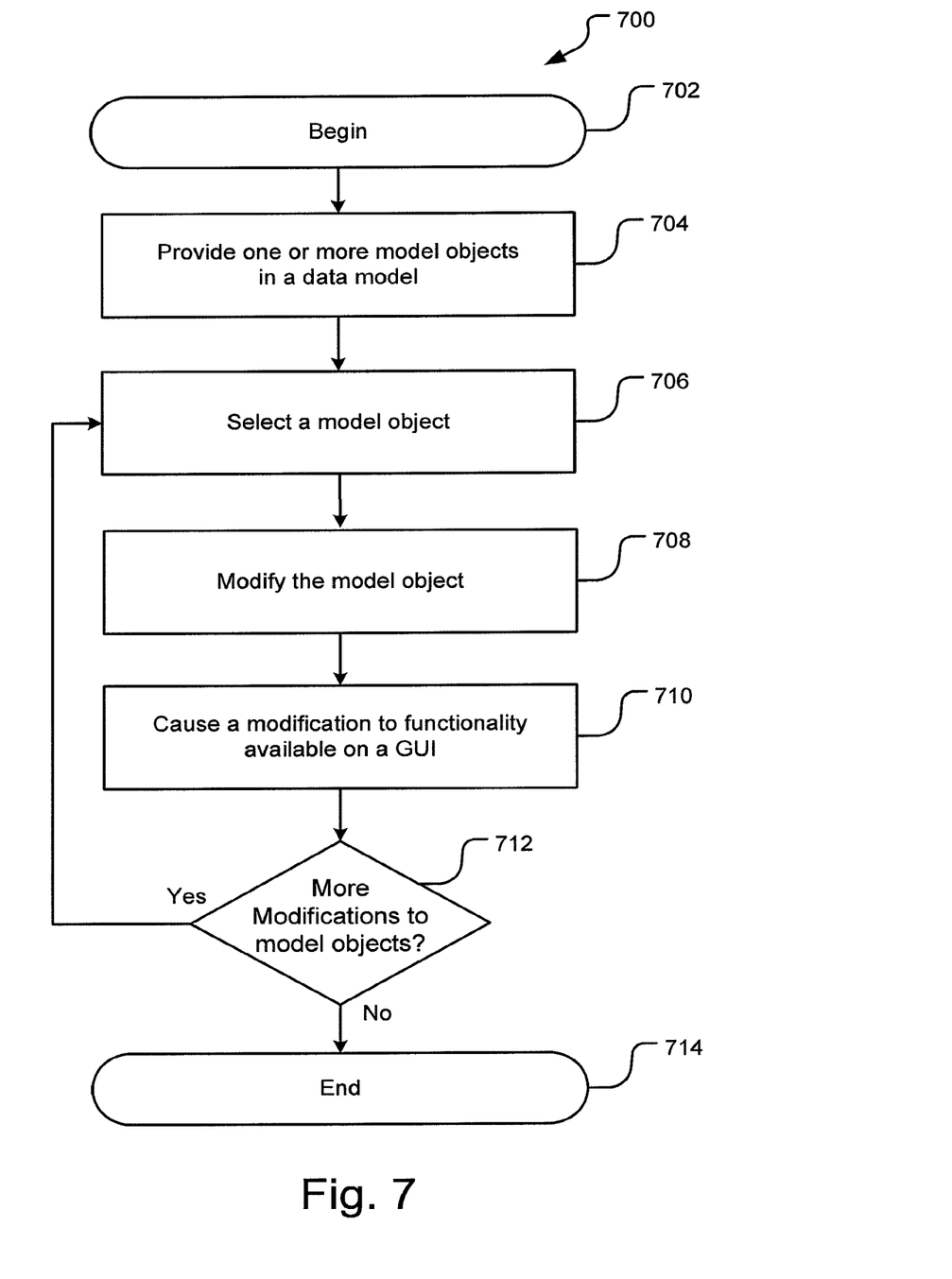
FIG. 7 is a flow diagram representing an embodiment of a method for modifying a model object within a data model to modify functionality available on a GUI.

FIG. 7 is a flow diagram representing an embodiment of a method for modifying a model object within a data model in order to modify functionality available on a GUI.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

The method of FIG. 7 begins with begin operation 702. Begin operation 702 may refer to any suitable initiation of a method for providing a model object in a data model (e.g., data model 120). According to embodiments, the data model may be accessible on a server (e.g., server 104), which may provide the data model for modification via a development tool or otherwise. According to some embodiments, the model object may be provided in a markup language, e.g., XML, within the data model. According to alternative embodiments, the model object may be provided via the development tool in communication with the data model such that the markup language itself is not visible to a user.

At provide model object operation 704, one or more model objects may be provided for managing a GUI. According to some embodiments, the one or more model objects may be provided as part of a data model. According to alternative embodiments, the one or more model objects may be provided via creating the one or more model objects using, for example, a development wizard. According to still other embodiments, the one or more model objects may be provided as XML macros (e.g., for common model objects). According to further embodiments, one or more model objects may be created and stored such that they may be reused. For example, according to embodiments, a user (e.g. an administrator) may request functionality associated with one or more model objects be added, deleted, or modified in order to modify a GUI managed by the developer. As described above, a model object may comprise an encapsulated task, an encapsulated data item, an encapsulated task including one or more encapsulated additional tasks, or an encapsulated task including one or more encapsulated data items, or any combination thereof. Furthermore, each task comprised in a model object may be mapped to one or more commands for performing the task and each data item comprised in a model object may be mapped to one or more rules or conditions for transforming data.

At select model object operation 706, a model object may be selected via communication with a development tool, for example. For example, an XML definition of the model object may be accessed. According to alternative embodiments, the model object may be selected or accessed via any suitable means via communication with any suitable module or component, either on a server (e.g., server 104) or on a client (e.g., client 102). According to embodiments, the model object may be accessed in a data model stored on a server.

At modify model object operation 708, the model object may be modified within the data model. According to an embodiment, one or more tasks or one or more data items associated with the model object may be modified. That is, according to embodiments, a mapping of a task to a command for performing the task may be modified. For example, the task may be mapped to an alternative command for performing the task, to an additional command for performing the task, to an updated command for performing the task, etc. According to other embodiments, a mapping of a data item to one or more rules or conditions for transforming data may be modified. For example, the data item may be mapped to an additional rule or condition, an updated rule or condition, etc.

According to another embodiment, associations within a model object may be modified. That is, according to embodiments, the model object may be modified by associating it with one or more additional tasks or data items or by associating it with one or more alternative tasks or data items. According to further embodiments, one or more tasks or data items may be deleted from a model object. Indeed, according to embodiments described herein, any suitable modification to the model object may be conducted within the spirit of the present disclosure. Upon modification of the model object, a mapping engine interpreting the modified model object may invoke a different set of task commands or data transformation manipulations. Accordingly, the results associated with executing the modified model object may also be different.

At cause GUI modification operation 710, the modification to the model object may cause a modification to functionality available on a GUI. For example, as described above, a UI element may reference the modified model object. Thus, upon activating the UI element on the GUI, a UI/Action component may communicate with a presentation component, which may communicate with a mapping engine via a network. The mapping engine may interpret the referenced modified model object. As described above, the modified model object may be associated with a different set of task commands or data transformation manipulations. As such, the mapping engine may return different results for the referenced modified model object than for a previous referenced model object. As such, the modified model object may provide modified functionality to the GUI upon activation of the UI element. Indeed, by modifying the model object on the data model, all UI elements referencing the model object may be automatically updated in a UI conceptual model. In this way, functionality may be modified on a GUI without recoding, but by simply modifying a model object referenced by one or more UI elements in a UI conceptual model. That is, upon rendering a UI element referencing the modified model object, modified functionality may be provided on the GUI.

At determination operation 712, a determination is made whether to conduct more modifications to model objects in the data model. In embodiments, the determination is based on input received through a user interface. If it is determined to conduct more modifications, the method may return to operation 706. Alternatively, if it is determined not to conduct more modifications, the method may proceed to end operation 714.

At end operation 714, the method of FIG. 7 may be terminated via any suitable means. For example, end operation 714 may involve closing the one or more development tools. According to embodiments, end operation 714 does not in any way prevent conducting begin operation 702 again at some future time.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

What is claimed is:

1. A computer system, comprising:
   at least one processor; and
   at least one memory, communicatively coupled to the at least one processor and including computer-readable instructions that, when executed by the at least one processor, perform a method of managing a graphical user interface (GUI), the method comprising:
   providing a UI element, wherein the UI element references a model object mapping a first task to at least one command for performing the first task;
   adding, to a first page definition, a first reference to the UI element;
   adding, to a second page definition, a second reference to the UI element;
   receiving a modification to the UI element; and
   automatically modifying a rendering of the modified UI element on a first corresponding page and a second corresponding page of the GUI without receiving recoding of the first page definition or the second page definition.

2. The computer system of claim 1, further comprising:
   in response to receiving an activation of the modified rendering of the modified UI element, performing the first task.

3. The computer system of claim 1, wherein functionality associated with the first corresponding page and the second corresponding page of the GUI is modified upon rendering the modified UI element.

4. The computer system of claim 1, wherein the model object further maps a second task to a second command for performing the second task.

5. The computer system of claim 4, further comprising:
   in response to receiving an activation of the modified rendering of the modified UI element, performing the first task and the second task.

6. The computer system of claim 1, wherein the model object further comprises a data item having rules and conditions for transforming data.

7. The computer system of claim 6, in response to receiving an activation of the modified rendering of the modified UI element, the method further comprising:
   transforming data based on the data item; and
   executing the first task using the transformed data as input.

8. The computer system of claim 1, wherein the UI element further defines at least one visual control for managing the GUI.

9. A non-transitory computer storage medium comprising computer-executable instructions that when executed by a processor cause the processor to:
   provide a UI element, wherein the UI element references a model object mapping a first task to at least one command for performing the first task;
   add, to a first page definition, a first reference to the UI element;
   add, to a second page definition, a second reference to the UI element;
   receive a modification to the UI element; and
   automatically modify a rendering of the modified UI element on a first corresponding page and a second corresponding page without receiving recoding of the first page definition or the second page definition.

10. The non-transitory computer storage medium of claim 9, the computer-executable instructions further causing the processor to:
    in response to receiving an activation of the modified rendering of the modified UI element, perform the first task.

11. The non-transitory computer storage medium of claim 9, wherein functionality associated with the first corresponding page and the second corresponding page of the GUI is modified upon rendering the modified UI element.

12. The non-transitory computer storage medium of claim 9, wherein the model object further maps a second task to a second command for performing the second task.

13. The non-transitory computer storage medium of claim 12, the computer-executable instructions further causing the processor to:
    in response to receiving an activation of the modified rendering of the modified UI element, perform the first task and the second task.

14. The non-transitory computer storage medium of claim 9, wherein the UI element further defines at least one visual control for managing the GUI.

* * * * *